Dec. 18, 1928.
L. McCARTHY
1,695,383
METHOD OF AND APPARATUS FOR SEPARATING AND CLEANING MICA
Filed Nov. 27, 1922
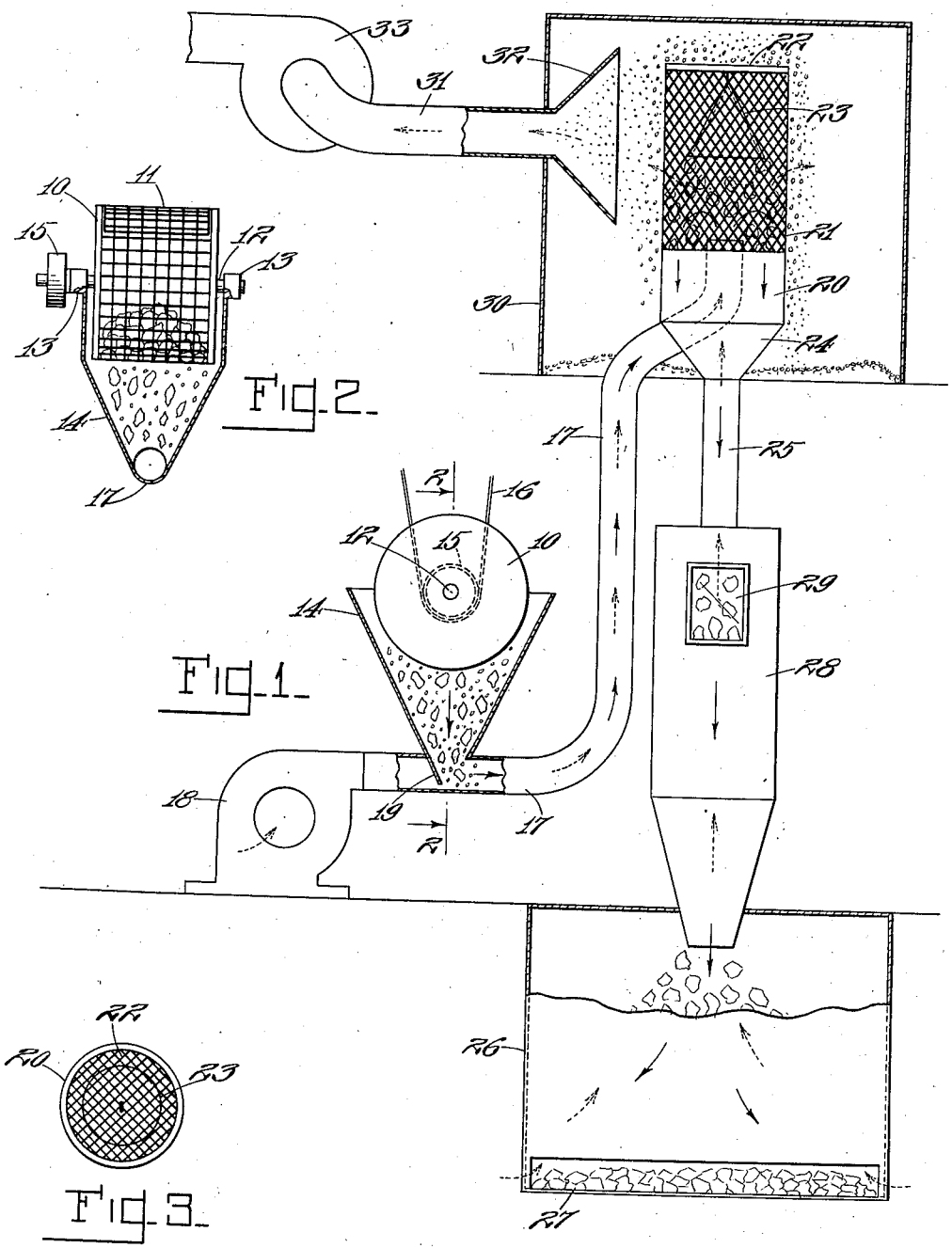

Patented Dec. 18, 1928.

1,695,383

UNITED STATES PATENT OFFICE.

LOUIS McCARTHY, OF BOSTON, MASSACHUSETTS, ASSIGNOR TO THE MACALLEN COMPANY, OF BOSTON, MASSACHUSETTS, A CORPORATION OF MASSACHUSETTS.

METHOD OF AND APPARATUS FOR SEPARATING AND CLEANING MICA.

Application filed November 27, 1922. Serial No. 603,485.

This invention relates to the separation of leaves of mica from each other and from the dust and fragments adhering thereto as they come from the source of production, as well as to the grading thereof in order to separate the undersized and broken leaves from the relatively large and perfects ones, thereby preparing the several grades for the various uses for which they are employed in the industrial arts.

Mica as it comes from the source of production, and especially that imported from India, has usually been split along its planes of cleavage, in order to separate the masses or books into their constituent leaves, and the latter packed for shipment in boxes or other containers. As a result of the handling which these containers receive in transportation, and as an incident to the time during which the mica remains packed, the individual leaves are more or less broken and are, moreover, so closely massed together as to make their separation difficult, so that, in establishments where the mica leaves are made up into manufactured articles, a considerable amount of labor is involved in separating the massed leaves, and in cleaning or freeing them from the broken fragments and dust with which they are more or less mixed. The smaller mica fragments and mica dust also have their uses in the arts, and it is desirable that they be separated from each other as well as from the larger leaves of plate mica.

The present invention has for its general object the separation of the massed mica leaves from each other and from the smaller leaves or fragments and the mica dust, as well as the separation of said fragments and dust from each other.

The more particular objects of the invention, together with one mode of carrying the same into effect, will best be understood from the following description of the construction and operation of an apparatus arranged and operated in accordance therewith. It will be understood, however, that the particular construction and arrangement shown, and the particular operations described, have been chosen for illustrative purposes merely, and that the invention, as defined by the claims hereunto appended, may be otherwise practiced without departure from its spirit and scope.

In said drawings:

Fig. 1 is a somewhat diagrammatic elevation, partly in vertical section, of the complete apparatus.

Fig. 2 is a section on the line 2—2, Fig. 1.

Fig. 3 is a detail plan view of the foraminous chamber.

In the apparatus shown, the massed mica, as it is removed from the boxes, is placed in a foraminous drum 10 through a filling opening afforded by a hinged or movable section 11. The drum 10 is carried by a shaft 12 journalled in bearings 13 at the top of a hopper 14, said shaft having a pulley 15 whereby said drum may be rotated from any suitable source of power through a belt 16. The openings in the drum 10, which is preferably composed of woven wire fabric, are sufficiently large to permit the passage therethrough of the largest mica leaves, so that, as the drum rotates, the larger masses are broken up and are sifted or gradually fed into the hopper 14. Said hopper communicates at its lower end with a conduit 17 at one end of which is a blower 18, whereby a pressure of air or other gaseous fluid is maintained at that end of said conduit, and a strong draft or blast caused to pass therethrough. The wall of the hopper 14 at the side adjacent the blower 18 is extended part way across the conduit 17, as shown at 19, thereby constituting, in effect, an injector, whereby the mica flakes are positively drawn into the conduit 17 from the hopper 14 by the blast passing the mouth of said hopper. At its end opposite the blower 18 the conduit 17 communicates with a chamber 20 having a foraminous wall 21 and also, if desired, a foraminous top 22 (Figure 3), said wall and top being preferably also composed of woven wire fabric, but the openings therein being smaller than those of the drum 10, so as to prevent the passage therethrough of the larger mica leaves which it is desired to separate out. The chamber 20 is preferably cylindrical with its axis vertical, and the proximate end of the conduit 17 extends thereinto adjacent the bottom thereof and thence upwardly therein substantially axially thereof for a short distance. Above the end of the conduit 17 within the chamber 20 is a conical baffle 23, said baffle being suspended from the top 22 and disposed with its base toward the conduit 17. The chamber 20, as shown, is formed with a conical or funnel-shaped bottom 24 having an axial opening which communicates with an outlet chute 25 leading to a bin 26, said bin having adjacent its bottom an opening or door 27 through which the larger separated and cleaned mica leaves may be removed from time to time as they are required. Between the chamber 20 and the bin 26 the chute 25 is preferably formed with a portion 28 of abruptly enlarged cross sectional area, said portion being preferably provided with a window 29 through which the descent of the mica through said chute may be observed. The inner chamber 20 is surrounded and enclosed by an outer chamber 30 with the upper part of which communicates a conduit 31 having a flaring entrance 32 and in which is located a fan or equivalent suction device 33.

In carrying out my improved method by means of the apparatus above described, the massed leaves of mica are supplied or fed from the drum or sifting device 10 to the hopper 14, from which they are injected into the conduit 17 by the blast therein, and are carried along said conduit, the blast serving effectually to separate said leaves from each other. In Figure 1, the course of the air currents is indicated by dotted arrows, while the direction of travel of the larger mica leaves is indicated by full-line arrows. From the conduit 17 the leaves are ejected upwardly into the inner chamber 20, the smaller leaves and dust particles passing through the foraminous wall 21, and said small leaves falling by gravity to the bottom of the outer chamber 30. The suction in the conduit 31 causes the dust particles to be drawn with the air through said conduit, said dust or fine particles of mica being discharged by said conduit at any suitable point. The suction fan 33 is preferably so constructed or operated as to have a slightly greater capacity than the blower 18, so that, while the suction through the conduit 31 is insufficient to cause the smaller mica leaves (which fall to the bottom of the outer chamber 30) to be drawn into the conduit 31 with the dust particles, a slightly subnormal pressure is maintained in the chamber 30, thereby inducing a slight upward draft through the bottom of the inner chamber 20, the air entering the bin 26 through the door 27 and passing upwardly through the delivered leaves and the discharge chute 25. This upward draft is insufficient to prevent the larger mica leaves, which are arrested by the foraminous wall 21, from falling by gravity through the open bottom of the chamber 20 and chute 25 to the bin 26, but is sufficient to cause said leaves to fall very gently and slowly through said chute and into said bin, thereby preventing the same from becoming again compacted or massed in said bin. The latter effect is aided by the abruptly enlarged section 28 of the chute 25, which tends to cause the air currents to eddy somewhat and thereby further impede the direct downward passage of the mica flakes under the influence of gravity.

The conical baffle 23 provides a dead-air space in the upper part of the chamber 20 immediately above the end of the conduit 17, thereby abruptly changing the course of the larger mica leaves, preventing them from being drawn by suction against the foraminous top 22 of said chamber, and reversing their direction so as to cause them to fall gently about the end of the conduit and through the open bottom of the chamber.

Having thus described my invention, I claim:—

1. The herein described method of handling separated plates or leaves of mica and delivering the same without compaction or adhesion which consists in permitting the same to fall by gravity substantially to the point of delivery against an upward current of gaseous fluid.

2. The herein described method of separating split but massed leaves of mica from one another and delivering the same without compaction or adhesion which consists in introducing the massed leaves into a blast of gaseous fluid to separate the same and thereafter permitting the saparated leaves to fall by gravity substantially to the point of delivery against an upward current of gaseous fluid.

3. The herein described method of cleaning separated leaves of mica and delivering the same in a condition for use without compaction or adhesion which consists in permitting the mica leaves to fall by gravity substantially to the point of delivery against an upward current of gaseous fluid while withdrawing the impurities by suction.

4. The herein described method of cleaning separated leaves of mica and delivering the same in a condition for use without compaction or adhesion which consists in permitting the mica leaves to fall by gravity substantially to the point of delivery against an upward current of gaseous fluid while withdrawing the impurities by suction through an interposed foraminous body.

5. The herein described method of cleaning and grading separated leaves of mica and delivering the same in condition for use without compaction or adhesion which consists in permitting the larger leaves to fall by gravity substantially to the point of delivery against an upward current of gaseous fluid while withdrawing the smaller leaves and dust particles by suction.

6. The herein described method of cleaning and grading separated leaves of mica and delivering the same in a condition for use without compaction or adhesion which consists in permitting the larger leaves to fall by gravity substantially to the point of delivery against an upward current of gaseous fluid while withdrawing the smaller leaves and dust particles by suction and permitting said smaller leaves to fall by gravity out of the current so induced.

7. The herein described method of handling separated plates or leaves of mica and delivering the same without compaction or adhesion which consists in permitting the same to fall by gravity against an upward current of gaseous fluid introduced through the mass of leaves being delivered, and maintaining an upward current of gaseous fluid through the mass of delivered leaves.

8. The herein described method of separating massed leaves of mica from one another and cleaning the same which consists in introducing the massed leaves into a blast of gaseous fluid to separate the same and withdrawing the impurities therefrom by suction.

9. The herein described method of separating massed leaves of mica from one another and cleaning and delivering the same which consists in introducing the massed leaves into a blast of gaseous fluid to separate the same and permitting the separated leaves to fall by gravity against an upward current of gaseous fluid while withdrawing the impurities by suction.

10. The herein described method of separating massed leaves of mica from one another and cleaning and grading the same which consists in introducing the massed leaves into a blast of gaseous fluid to separate the same, withdrawing the smaller leaves and dust particles from the larger leaves by suction, and permitting the smaller leaves to fall by gravity out of the current so induced.

11. The herein described method of separating massed leaves of mica from one another and cleaning, grading and delivering the same which consists in introducing the massed leaves into a blast of gaseous fluid to separate the same, permitting the separated leaves to fall by gravity while withdrawing the smaller leaves and dust particles from the larger leaves by suction, and permitting the smaller leaves to fall by gravity out of the current so induced.

12. The herein described method of separating massed leaves of mica from one another and cleaning, grading, and delivering the same which consists in introducing the massed leaves into a blast of gaseous fluid to separate the same, permitting the separated leaves to fall by gravity against an upward current of gaseous fluid, withdrawing the smaller leaves and dust particles from the larger leaves by suction, and permitting the smaller leaves to fall by gravity out of the current so induced.

13. An apparatus for cleaning mica comprising a chamber having a foraminous wall, a conduit communicating therewith adjacent the bottom thereof and extending upwardly therein, a baffle in said chamber arranged to produce a dead air space above the end of said conduit, means for maintaining a blast of gaseous fluid through said conduit toward said chamber, and means for supplying said mica to said conduit.

14. An apparatus for cleaning mica comprising a chamber having a foraminous wall, a discharge chute communicating with the bottom of said chamber, a conduit also communicating with said chamber, a conical baffle in said chamber disposed with its base toward said conduit, means for maintaining a blast of gaseous fluid through said conduit toward said chamber, and means for supplying said mica to said conduit.

15. An apparatus for cleaning mica comprising a chamber having a foraminous wall, a conduit communicating with said chamber, means for maintaining a blast of gaseous fluid through said conduit into said chamber, means for supplying said mica to said conduit, a discharge chute communicating with the bottom of said chamber, and a bin with which said chute communicates, said chute having a portion of enlarged cross sectional area between said chamber and bin.

16. An apparatus for cleaning and separating mica comprising a chamber having a foraminous wall, a conduit communicating therewith, means for maintaining a blast of gaseous fluid through said conduit toward said chamber, means for supplying said mica to said conduit at a point in advance of said chamber, a second chamber communicating with said first named chamber through said foraminous wall, and means for producing suction from said second chamber.

17. An apparatus for cleaning and separating mica comprising a chamber having a foraminous wall, a conduit communicating at one end with said chamber, a blower at the opposite end of said conduit, a hopper communicating with said conduit between said blower and chamber, a second chamber communicating with said first named chamber through said foraminous wall, and a suction fan for exhausting said second chamber.

18. An apparatus for cleaning and separating mica comprising a chamber having a foraminous wall and an open bottom, a conduit communicating with said chamber, means for maintaining a blast of gaseous fluid through said conduit toward said chamber, means for supplying said mica to said conduit, a second chamber communicating with said first named chamber through said foraminous wall, and means for exhausting gaseous fluid from said second chamber, said last named means having a capacity in excess of said blast supplying means.

19. An apparatus for separating and cleaning mica comprising inner and outer chambers and a foraminous wall between said chambers, a conduit communicating with said inner chamber adjacent the bottom thereof and having its end extended upwardly therein, a blower at the opposite end of said conduit, a hopper communicating with said conduit between said blower and chamber, a foraminous sifting device for supplying mica to said hopper, a discharge chute leading from the bottom of said inner chamber, a second conduit communicating with the upper portion of said outer chamber, and an exhaust fan in said second conduit.

20. An apparatus of the character described comprising a chamber having a foraminous wall, a second chamber adjacent said first named chamber and communicating therewith through said wall, a downwardly extending chute leading from said first named chamber, a supply conduit for supplying material to be graded to said first named chamber, means for blowing air through said conduit into said first named chamber, and means independent of said blowing means for exhausting air from said second chamber, said last named means having a capacity slightly in excess of the first mentioned blowing means.

In testimony whereof I affix my signature.

LOUIS McCARTHY.